Jan. 25, 1966  E. J. HOJNOWSKI  3,230,938
ROTARY INTERNAL COMBUSTION ENGINE
Filed Oct. 9, 1963  3 Sheets-Sheet 1

INVENTOR.
EDWARD J. HOJNOWSKI

BY *McCormick, Paulding & Huber*
ATTORNEYS

Jan. 25, 1966   E. J. HOJNOWSKI   3,230,938
ROTARY INTERNAL COMBUSTION ENGINE
Filed Oct. 9, 1963   3 Sheets-Sheet 2
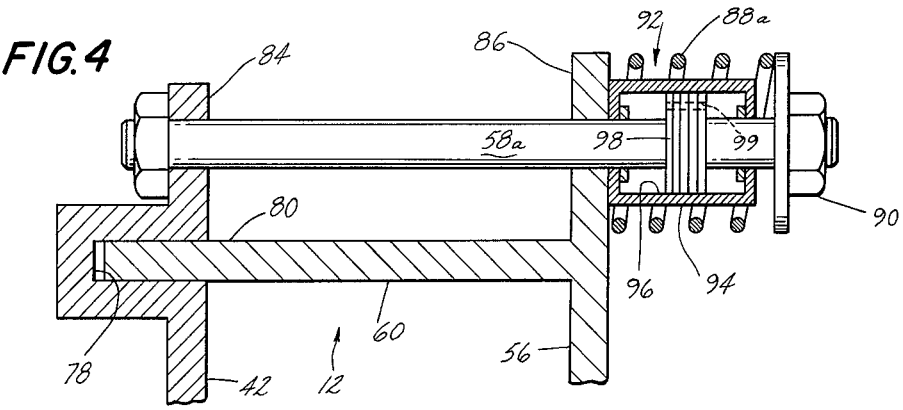
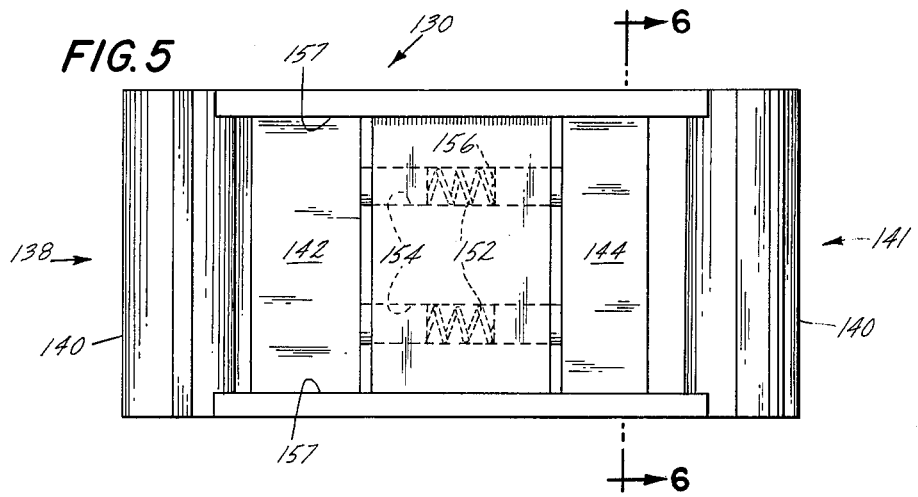
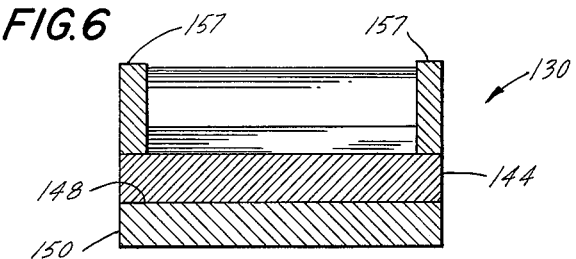

United States Patent Office 3,230,938
Patented Jan. 25, 1966

3,230,938
ROTARY INTERNAL COMBUSTION ENGINE
Edward J. Hojnowski, 272 Broad St., New Britain, Conn.
Filed Oct. 9, 1963, Ser. No. 315,029
11 Claims. (Cl. 123—16)

This invention relates to internal combustion engines and more particularly to an engine in which a rotating member is driven by a succession of explosive impulses contained in peripherally spaced chambers defined in part by said rotating member.

A general object of the present invention is to provide a rotary engine having a minimum of moving parts so that the initial cost of such an engine, as well as the maintenance expenses thereof, can be held to very low values.

Another general object of the present invention is to provide a rotary engine in which a plurality of peripherally spaced expansion chambers are filled with an air charge by one or more novel compression chambers.

Still another object of the present invention is to provide a rotary engine which is peculiarly well suited to that system of carburetion known as fuel injection.

A still further object of the present invention is to provide a rotary engine which avoids the use of eccentrically mounted shafts or the like, and therefore avoids the extensive balancing usually associated with rotary engine designs.

Yet another object of the present invention is to provide a rotary engine in which the exhaust gases are ejected from a rotating part of the engine so that the back pressure felt by the engine is lower than the ambient pressure of the atmosphere in which the engine is operating.

A more specific object of the present invention is to provide a rotary engine in which a series of reciprocating elements cooperate with said rotating member to define the peripherally spaced expansion chambers, which elements simultaneously operate on the air charge in said compression chambers to compress the same.

The drawings show preferred embodiments of the inveniton and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 4 is an alternative construction for the expansion joint used to connect the front and rear portions of the rotor;

FIG. 5 is a plan view of a sliding abutment of the FIG. 1 engine;

FIG. 6 is a sectional view of the FIG. 5 abutment along the line 6—6 of that figure;

Figure 1:
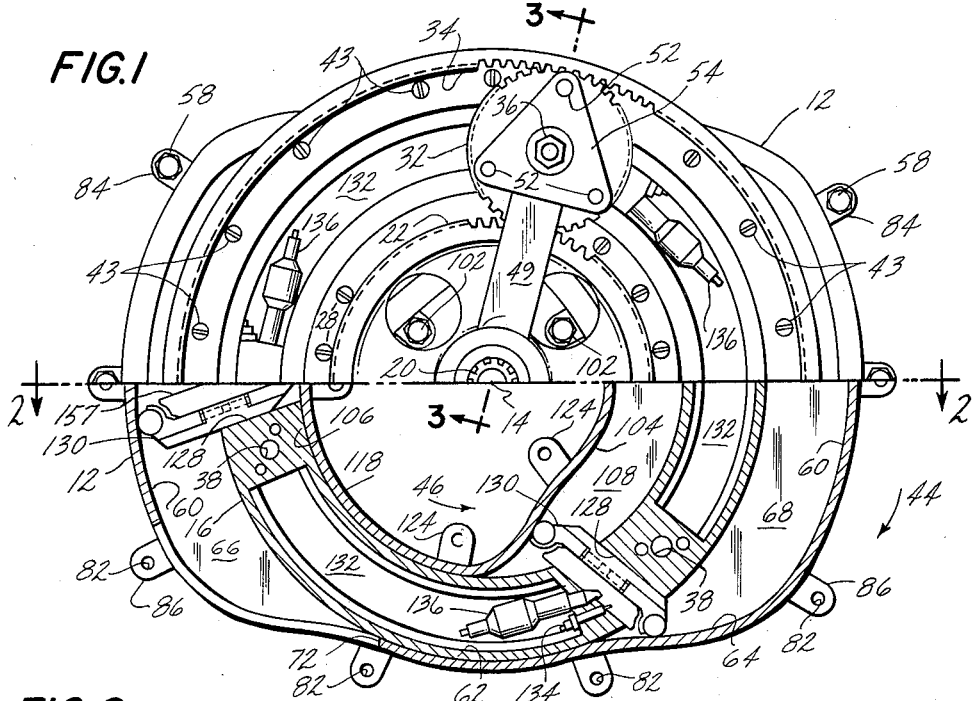
FIG. 1 is a plan view of a preferred embodiment of the present invention, the lower half of the engine being shown in section to better illustrate internal parts.
Figure 2:
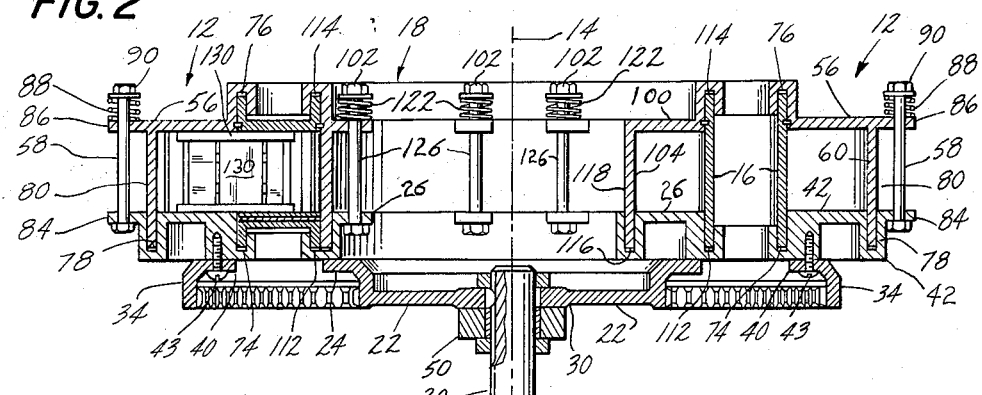
FIG. 2 is a sectional view of the FIG. 1 engine along the line 2—2 of that figure.

Referring now to FIGS. 1 and 2, a rotary engine of the present invention is shown as comprising an outer rotor 12 supported for rotation about a central axis 14 by an annular stator 16. An inner shaft 18 rotates about the same axis inside the stator and is generally hollow as best shown in the lower half of FIG. 1.

Figure 3:
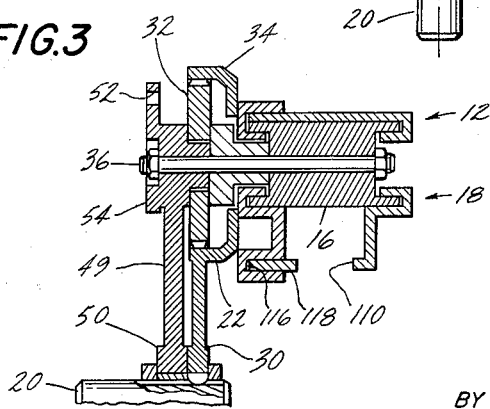
FIG. 3 is a sectional view of the FIG. 1 engine along the line 3—3 of that figure.

In the preferred embodiment shown, an engine drive, or output, shaft 20 is provided at the front of the engine and is rigidly connected to the hollow shaft 18 by a sun gear 22. The sun gear has a peripheral flange 24 which is screwed to a front portion 26 of the hollow shaft 18 by a plurality of circumaxially spaced screws 28, 28 and a hub portion 30 which may be keyed to the drive shaft 20 as shown in FIGS. 2 and 3.

The upper half of FIG. 1 shows the sun gear 22 in engagement with a set of three planet gears 32, 32 (one shown) which in turn engage a ring gear 34 for rotation of the latter in a direction opposite to said sun gear 22. The planet gears 32, 32 are rotatably supported in the fixed framework of the stator 16 by three bolts 36, 36 received in the holes 38, 38. The ring gear 34 is provided with an annular flange 40 which is screwed to the front portion 42 of the rotor 12 by a plurality of circumaxially spaced screws 43, 43. As so arranged, clockwise rotation of the rotor in the direction of the arrow 44 results in counterclockwise rotation of the hollow shaft 18, as indicated by the arrow 46. The three planet gears 32, 32 are further supported in the fixed framework of the machine by a stationary spider having three legs 49, 49 for the gears 32, 32. This spider serves to rotatably support the drive shaft 20, the inner ends of each of said spider legs 49, 49 defining a hub 50 which rotatably supports said shaft as best shown in FIG. 3. The spider also functions as a means for mounting the entire engine. Three holes 52, 52 are provided for that purpose in each of the generally triangular outer end portions 54, 54 of said spider legs 49, 49.

Turning now to the construction of the outer rotor 12 in greater detail, a rear portion 56 is bolted to the front portion 42 thereof by a plurality of peripherally arranged bolts 58, 58. The rear portion 56 defines an axially extending internal surface 60 which varies radially around the rotor 12. Two diametrically opposed sections 62, 62 of said internal surface are approximately the same diameter as the outer diameter of the annular stator 16. As shown two circumaxially spaced sections 64, 64 of said internal surface 60 between these sections 62, 64 are recessed radially outwardly with respect to the central axis 14 to define two outer cavities 66 and 68 best shown in the lower half of FIG. 1. These outer cavities 66 and 68 are sealed from the outside atmosphere except for two exhaust ports 70 and 72 defined by the trailing sections of each of said cavities.

As best shown in FIG. 2, the annular stator 16 is of one-piece construction and the front and rear rotor portions 42 and 56 respectively, are slidably received on outer front and rear flanges 74 and 76 respectively, defined by said stator. The outer cavities serve to define in part the expansion chambers of the engine in a manner to be described in greater detail hereinbelow and hence require means for accommodating the thermal expansion of the rotor 12. More specifically, the different rates of thermal expansion experienced by the rotor and the stator are accommodated by a novel construction for joining the front and rear portions of the former. As shown, a generally peripherally extending groove 78 is provided on the inside surface of the front portion 42, and an axially extending part 80 of said rear portion 56 is slidably received in this groove 78. These front and rear rotor portions 42 and 56 respectively are bolted together by the above-mentioned axially extending bolts 58, 58 which are received in aligned holes 82, 82 provided therefor in radially extending ears 84, 86 on said front and rear rotor portions. A compression spring 88 is provided between the rear face of each ear 86, and a nut 90 on each bolt, so as to permit the axially extending part 80 of the rotor rear portion to slide axially in the groove 78 of the rotor front portion. As so constructed, the rotor 12 will be seen to be relatively unaffected by any differential rate of thermal expansion or contraction with respect to the stator 16.

FIG. 4 illustrates an alternative construction for accommodating the thermal expansion of the rotor 12. The construction there shown is generally similar to that just described with reference to FIG. 2 except for the addition of hydraulic damping means 92 concentrically arranged within a helical spring 88a. The damping means 92 is seen to comprise a sealed cylinder 94 having a hollow interior bore 96 through which a bolt 58a extends carrying a piston 98. The latter has a small opening 99 generally axially thereof through which fluid in the cylinder must pass as the piston traverses the bore 96 due to thermal expansion or contraction of the rotor 12 with respect to the stator (not shown).

Turning now to the construction of the hollow shaft 18, FIG. 2 reveals that said shaft is constructed in a manner generally similar to that of the rotor 12, a rear portion 100 being bolted to the front portion 26 of the shaft by a plurality of peripherally arranged bolts 126, 126. The rear portion 100 has an axially extending external surface 104 which varies radially around the shaft 18. A diametrically opposed portion 106 of said internal surface is of approximately the same diameter as the inner diameter of the annular stator 16. As shown in FIG. 1, the remaining portion of said external surface 104 is recessed radially inwardly with respect to the central axis 14 to define an inner cavity 108. This inner cavity is sealed from the outside atmosphere except for an intake port 110 defined thereby and best shown in FIGS. 3, 7 and 8.

As mentioned, the annular stator is of one-piece construction and the front and rear shaft portions, 26 and 100, respectively, are slidably received on front and rear circular flanges, 112 and 114 respectively, defined by said stator. The stator serves to define in part the expansion chambers of the engine in a manner to be described in greater detail hereinbelow and hence means are provided for accommodating the thermal expansion of the stator with respect to the shaft 18. As shown, said means are generally similar to that employed with reference to the two-piece rotor described hereinabove. A generally peripherally extending groove 116 is provided on the inside surface of the front portion 26, and an axially extending part 118 of said rear portion 100 is slidably received therein. The axially extending bolts 126, 126 join these front and rear shaft portions 26 and 100 respectively, and a compression spring 122 is provided between the rear face of an ear 124 on the rear shaft portion and a nut 120 on each of said bolts 126, 126 so as to permit the axially extending part 118 of the rear shaft portion 100 to slide in the groove 116 of the front shaft portion 26. As so constructed, the shaft 18 is relatively unaffected by any differential rate of thermal expansion or contraction with respect to the stator 16.

It will be apparent that the hydraulic damping means of FIG. 4 could be employed in addition to the springs 122, 122 and the remarks made in connection with the description of that figure apply equally to the thermal expansion or contraction of the stator with respect to the shaft 18.

As mentioned, the stator 16 is annular in planform having cylindrical outer and inner surfaces which define in part said outer and inner cavities respectively. Also part of said stator are the outer and inner pairs of circular flanges 74, 76 and 112, 114 respectively, which rotatably support the rotor and shaft respectively. With further reference to the one-piece stator 16, a series of three generally radially extending slots 128, 128 are defined therein at circumaxially equally spaced locations. These slots 128, 128 slidably receive three vane-like abutments 130, 130 to be described in greater detail hereinbelow. From FIG. 7 it will be apparent that the angular spacing between these slots, and their associated abutments determines the circumferential extent of the outer cavities 66 and 68 and that this last-mentioned dimension, in conjunction with the relative rotational speeds of the rotor 12 and the shaft 18, determines the circumferential extent of the inner cavity 108. As shown, these outer cavities, 66 and 68, have symmetrically arranged intermediate sections of constant radial width, and also antisymmetrically arranged leading and trailing end sections the radial width of which varies from a minimum adjacent the outer annular surface of the stator to a maximum at said intermediate sections. The hollow shaft 18, which is caused to rotate at twice the rotational speed of said rotor and in the opposite direction, is recessed radially inwardly as mentioned and the shape of this recessed portion is such that a constant radial difference is maintained between the inner and outer cavity surfaces at these slots 128, 128. As so constructed and arranged, the abutments 130, 130 will be seen to maintain contact with these inner and outer cavity surfaces when the rotor and shaft rotate in the directions indicated in FIGS. 7 and 8.

Finally, still with reference to the stator 16, except for the slot defining portions 128, 128 thereof, and the hole defining portions 38, 38 adjacent thereto, the stator 16 is substantially hollow having three circumaxially spaced openings 132, 132 therethrough. These openings provide access to a series of three spark plugs 134, 134 and a series of three fuel injection nozzles 136, 136 associated with each of said slots 128, 128.

Turning now to the construction of the sliding abutments 130, 130, FIGS. 5 and 6 show the construction of one of these. Each abutment carries inner and outer sealing means, indicated generally at 138 and 141, respectively and located at each radial end thereof. As shown, said sealing means comprise inner and outer cylindrical members 140, 140, which are rotatably supported in inner and outer arms 142 and 144 respectively. In the construction shown, arm 142 and arm 144 are reciprocably received in inner and outer slots, 146 and 148, respectively, provided therefor in the inner and outer ends of a generally rectangular abutment base 150. Also included in each abutment 130 are biasing means for urging the inner and outer sealing means away from the base 150. As shown, said biasing means comprise a pair of compression springs 152, 152 carried in cylindrical bores 154, 154 provided therefor in the center portion of the base. A pair of cylindrical posts 156, 156 are provided on each arm 142 and 144 and are slidably received in said bores 154, 154 to prevent any axial displacement of the inner and outer sealing means, 138 and 141 respectively, with respect to the generally radially reciprocable base 150.

With further reference to the abutment base 150, two axially spaced radially extending flanges 157, 157 are provided at the sides thereof to define an abutment of substantially the same thickness as the corresponding dimension of the slot 128. From FIG. 1 it will be apparent that these flanges 157, 157 do not interfere with the reciprocable feature of the inner and outer sealing means, 138 and 141 respectively, the ends of said flanges being so shaped as to accommodate the respective arms 142 and 144 thereof.

Figure 7:
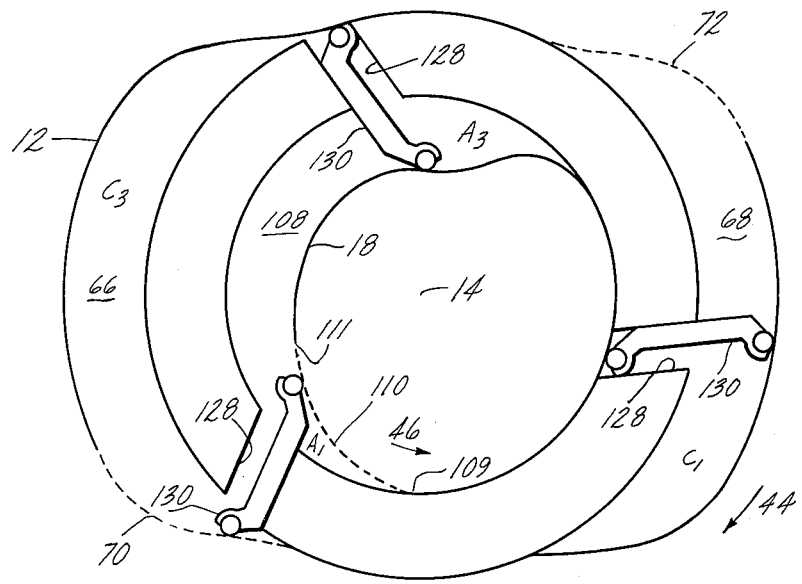
FIG. 7 is a schematic view of the FIG. 1 engine at a particular instant of time.
Figure 8:
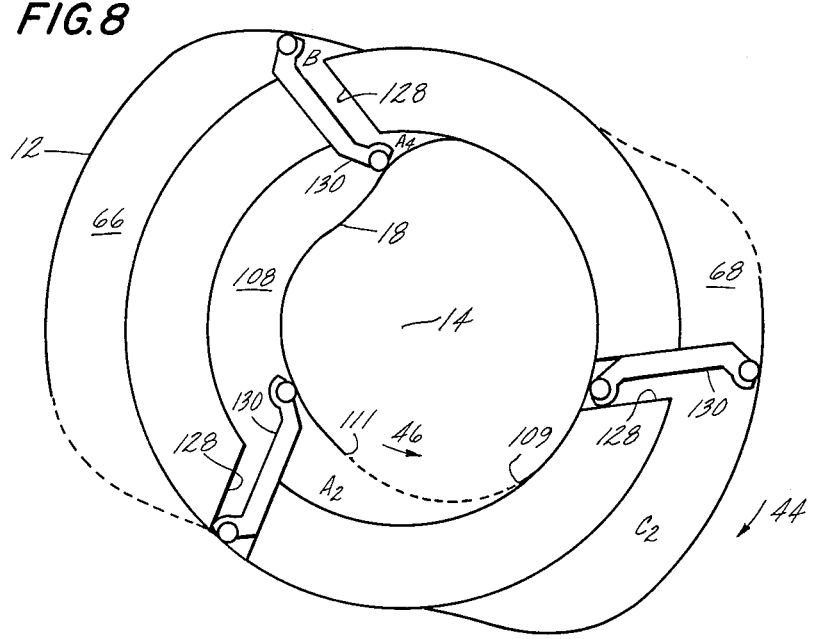
FIG. 8 is a schematic view similar to FIG. 6 but at a slightly later instant of time.

Referring now to FIGS. 7 and 8, the operation of the above-described engine can be conveniently demonstrated. It will be appreciated that air can be drawn into the hollow shaft 18 by suitable air induction means (not shown), and that cooperating means can be provided for metering fuel into the spaces between the abutments and the slot defining portions of the stator 16. Both the above means may be conveniently referred to as carburetor means for combining fuel with the air, and except for the location of the fuel injection nozzles 136, 136, need not be described in detail here since the present invention relates primarily to a novel internal combustion engine and not to the means for feeding the air charge into said engine.

The air intake port 110 provides a path for the air from the hollow interior of the shaft 18 into the inner cavity 108. As this shaft rotates in the direction of the arrow 46, the adjacent abutment 130 will be seen to define a compression chamber A, which chamber rotates with the shaft and varies in volume as indicated by the characters A1, A2, A3 and A4 seen alternately in FIGS. 7 and 8. It will be apparent that the rotating intake port 110 will capture a large volume of air as a result of its rotation since the leading and trailing edges, 109 and 111 respectively, are located at different radii from the axis of rotation 14. It will also be apparent that the volume of the compression chamber A is considerably less at A4 than at A3 resulting in the compression of the air charge therein as the shaft rotates in the direction indicated.

Referring now to FIG. 8, a combustion chamber, indicated generally at B, is defined in the inner and outer cavities, 108 and 66 respectively, by the abutment 130 and the slot defining portion of the stator 16. It will be observed that the compressed air charge A4 will be moved into this combustion chamber as the contrarotating shaft and rotor reach the position indicated at B. As best shown in FIG. 1, the fuel injection nozzle 136 and spark plug 134 cooperate to cause an explosion in this chamber. The resulting expansion caused by the heat of combustion imparts a successive series of explosive impulses to the leading end sections of each of the outer cavities 66 and 68 driving the rotor 12 in the direction indicated.

An expansion chamber C is defined in each of the outer cavities 66 and 68 by the sliding abutment 130 which traverses said cavity as the rotor rotates. This chamber C accommodates the expanding gases due to combustion in a controlled manner whereby the energy of combustion can be conveniently converted into usable kinetic energy. The characters C1, C2 and C3 depict the variation in volume of this chamber and the latter, C3, also represents the beginning of the exhaust portion of the cycle described herein.

The exhaust ports 70 and 72 will be seen to occupy a very advantageous location on the rotary engine shown in that the rotor 12, which defines these ports, is continually rotating in the direction indicated and a region of relatively low pressure is created in the area of said exhaust ports. As so constructed, the back pressure against which the engine is working is lower than the ambient pressure of the atmosphere in which the engine is operating.

Another advantage to the exhaust port location shown is that very little cooling is required for the engine in normal operating conditions. Where elevated temperatures are apt to be encountered during engine operation cooling fins could be easily provided at the periphery of the rotor to conduct away excess heat from the expansion chambers defined therein. Since the rotor will receive most of the heat of combustion due to the burning gases and since the rotor has its entire external surface exposed to the atmosphere the rotary engine shown has obvious advantages in any environment.

In conclusion, the rotary internal combustion engine shown has all of the usual advantages of rotary engine designs generally, including that of permitting a degree of compression of the air charge prior to combustion, which compression is independent of the degree of expansion required in absorbing the energy of the burning fuel and air mixture. In terms of engine efficiency it is well known that the compression ratio and the expansion ratio are determinative of the thermal efficiency of an internal combustion engine whether of the rotary or conventional piston type. One advantage of the former over the latter is that its construction permits the expansion ratio to be greater than the compression ratio. Since the compression ratio is inherently limited as a result of the fuel used in any internal combustion engine, it follows that the rotary engine is inherently more efficient because the expansion ratio is independent of the compression ratio.

The present invention not only permits a large expansion ratio but does so without the bulky size normally associated with a rotary engine. It will be apparent that the expansion ratio is directly related to the size of the expansion chamber. Most rotary engine designs achieve a high expansion ratio by providing for a relatively large cavity in the rotating member. In the engine shown for example, the expansion ratio could be materially increased by increasing the diameter of the rotor. However, it should be noted that this approach would require a stator of increased size creating balancing problems as well as larger and heavier bearings and the like. The present design seeks to optimize the volume of the outer cavities, 66 and 68, without incurring any size or weight penalty by inclining the abutments 130, 130 with respect to the radial direction as best shown in FIGS. 7 and 8. As so constructed and arranged, the effective expansion ratio is materially increased over that possible with purely radially reciprocable abutments. As noted this increase results in a very efficient rotary engine without the bulky size normally associated with rotating engines generally.

The invention claimed is:

1. An internal combustion engine comprising an annular stator, a concentric hollow shaft contacting the inner cylindrical surface of said stator and having at least one portion of its periphery recessed radially inwardly to define an inner cavity, means for introducing air into said inner cavity, a rotor concentric with said stator and contacting the outer cylindrical surface thereof, said rotor having at least two circumaxially spaced portions of its internal surface recessed radially outwardly to define two outer cavities, exhaust ports communicating with each of said outer cavities, means for rotatively connecting said shaft to said rotor whereby the former drives the latter in an opposite direction with respect thereto, at least three generally radially extending abutments slidably received in circumaxially spaced slots provided therefor in said stator, each of said abutments traversing said inner cavity as the shaft rotates to define a compression chamber therein, each of said abutments traversing said outer cavities as the rotor rotates to define expansion chambers therein, each of said abutments together with the adjacent slot defining portion of said stator defining an air passageway whereby a part of said inner cavity is caused to successively communicate with a part of each of said outer cavities for the supply of compressed air to the latter, and fuel introducing and igniting means for said outer cavities.

2. An internal combustion engine as defined in claim 1 wherein said air induction means includes an intake port defined by said hollow shaft and adapted to rotate therewith, said intake port having leading and trailing edge portions which are at different radial distances from the axis of rotation of said shaft whereby a greater quantity of the air in said hollow shaft can pass outwardly through said intake port than would be the case if both of said edges were at the same radial distance from said axis.

3. An internal combustion engine as defined in claim 1 wherein each of said exhaust ports are defined by said rotor and adapted to rotate therewith, each of said exhaust ports being so located with respect to the periphery of said rotor that the spent gases of combustion are exhausted into a region of lower back pressure than that of the ambient atmosphere in which the engine is operating.

4. An internal combustion engine as defined in claim 1 wherein the ratio of the angular speeds of said shaft and said rotor is a whole integer, and wherein both of said angular speeds are measured relative to said stator.

5. An internal combustion engine as defined in claim 4 wherein said means for so rotating said rotor and shaft comprise a sun gear attached to the shaft, a ring gear attached to the rotor, and at least one planet gear rotatably supported by the stator so as to engage both of these.

6. An internal combustion engine as defined in claim 4 wherein the recessed portion of said shaft and the recessed portions of said rotor are so shaped that the radial difference between these surfaces at the circumaxially spaced slots in said stator is a constant.

7. An internal combustion engine as defined in claim 6 and including means for accommodating the differential rate of thermal expansion and contraction of the rotor with respect to the stator.

8. An internal combustion engine as defined in claim 6 wherein each of said abutments has an inner end which engages the periphery of said shaft, and an outer end which engages the internal surface of said rotor whereby said abutments are caused to reciprocate in said stator slots as said shaft and rotor rotate.

9. An internal combustion engine as defined in claim 8 and including sealing means carried by each abutment at the inner and outer ends thereof, and biasing means included in each of said abutments for urging said inner and outer sealing means radially inwardly and radially outwardly respectively, whereat said inner sealing means is caused to engage said shaft periphery and said outer sealing means to engage said rotor internal surface.

10. An internal combustion engine as defined in claim 9 wherein said abutments are inclined with respect to the radial direction whereby to increase the volume of the expansion chambers in said outer cavities.

11. An internal combustion engine as defined in claim 10, wherein said fuel introducing means comprises a plurality of fuel injection nozzles which are supported adjacent to each of the slot defining portions of said stator so as to inject fuel directly into said passageway whereby the vaporizing of said fuel is facilitated by reason of the air passing therethrough.

References Cited by the Examiner

UNITED STATES PATENTS

| | | | |
|---|---|---|---|
| 1,923,561 | 8/1933 | Winckler | 123—16 |
| 2,118,253 | 5/1938 | Larson | 123—16 |
| 2,179,401 | 11/1939 | Chkliar | 123—16 |
| 3,008,457 | 11/1961 | Mezzetta | 123—16 |

DONLEY J. STOCKING, *Primary Examiner.*

KARL J. ALBRECHT, *Examiner.*